US012627619B2

(12) United States Patent
Tosun

(10) Patent No.: US 12,627,619 B2
(45) Date of Patent: May 12, 2026

(54) METHOD FOR CONTROLLING A PROCESS USING A PROGRAM PRODUCT

(71) Applicant: Cafer Tosun, Sofia (BG)

(72) Inventor: Cafer Tosun, Sofia (BG)

( * ) Notice: Subject to any disclaimer, the term of this patent is extended or adjusted under 35 U.S.C. 154(b) by 0 days.

(21) Appl. No.: 18/033,390

(22) PCT Filed: Dec. 22, 2020

(86) PCT No.: PCT/IB2020/062333
§ 371 (c)(1),
(2) Date: Apr. 24, 2023

(87) PCT Pub. No.: WO2022/084732
PCT Pub. Date: Apr. 28, 2022

(65) Prior Publication Data
US 2024/0022529 A1     Jan. 18, 2024

(30) Foreign Application Priority Data

Oct. 23, 2020     (DE) ..................... 10 2020 128 027.0

(51) Int. Cl.
*H04L 51/02*          (2022.01)
*G05B 19/042*        (2006.01)
(Continued)

(52) U.S. Cl.
CPC .......... *H04L 51/02* (2013.01); *G05B 19/0426* (2013.01); *G06F 40/205* (2020.01); *G08B 21/24* (2013.01); *H04L 51/046* (2013.01)

(58) Field of Classification Search
CPC ......... H04L 51/02; H04L 41/16; H04L 51/04;
H04L 67/306; G06N 20/00; G06N 3/08;
G06N 20/20; G06N 3/092; G06N 3/091;
G06N 3/02; G06N 3/0464; G06N 3/09;
G06F 40/205
See application file for complete search history.

(56) References Cited

U.S. PATENT DOCUMENTS 8,641,420 B2 *    2/2014   Poole ...................... F41A 33/00
                                                                                434/11
8,832,569 B2 *    9/2014   Chen ...................... G06Q 10/10
                                                                                715/780
(Continued)

FOREIGN PATENT DOCUMENTS

DE          102018212503          1/2020
DE          102019134312          6/2020

*Primary Examiner* — Alex Tran
(74) *Attorney, Agent, or Firm* — Cislo & Thomas LLP

(57) ABSTRACT

Methods are known for controlling processes using control software which keeps different control elements ready at the same time. In this respect, the process of suppressing or putting control elements out of service if the control elements are not available is likewise known. The invention is to be improved, however, in that control elements and decisions are given to the user such that an intuitive use is facilitated, and the user is guided through the control of a process. For this purpose, a process control is carried out via a program product, which is represented as a chat. The user and the program product act as communication participants, wherein the planned process is controlled by control commands which are requested in the course of the chat and entered or selected in response thereto.

11 Claims, 3 Drawing Sheets

(51) Int. Cl.
 *G06F 40/205*     (2020.01)
 *G08B 21/24*     (2006.01)
 *H04L 51/046*     (2022.01)

(56)       References Cited

U.S. PATENT DOCUMENTS

| | | | |
|---|---|---|---|
| 9,420,106 | B1 * | 8/2016 | Thirugnanasundaram .................. H04M 3/5191 |
| 10,026,092 | B2 * | 7/2018 | Heater ..................... G06F 40/30 |
| 10,504,029 | B2 * | 12/2019 | Edelen ................... G06Q 30/02 |
| 10,726,827 | B2 * | 7/2020 | Braz ....................... G10L 15/01 |
| 10,832,154 | B2 * | 11/2020 | Kashyap ............... G06N 20/00 |
| 10,834,026 | B2 * | 11/2020 | Nagaraja ................ G16H 80/00 |
| 10,862,836 | B2 * | 12/2020 | McGregor, Jr. ...... G06V 30/274 |
| 11,018,999 | B1 * | 5/2021 | Goldberg ............... H04W 4/12 |
| 11,297,016 | B1 * | 4/2022 | White .................... G10L 13/00 |
| 11,405,337 | B2 * | 8/2022 | Le .......................... G06N 3/045 |
| 11,425,059 | B2 * | 8/2022 | Joshi ...................... H04L 41/20 |
| 11,429,834 | B1 * | 8/2022 | Xue ..................... G06F 40/284 |
| 11,444,893 | B1 * | 9/2022 | Kalluri ................... G10L 15/22 |
| 11,495,190 | B2 * | 11/2022 | Saa-Garriga ........... G06N 20/00 |
| 11,514,897 | B2 * | 11/2022 | George ................... G06N 5/02 |
| 11,551,143 | B2 * | 1/2023 | Ganti ..................... G06N 20/00 |
| 11,599,729 | B2 * | 3/2023 | Wu ........................ G06N 3/088 |
| 2014/0279050 | A1 * | 9/2014 | Makar ................ G06F 16/9535 705/14.66 |
| 2018/0196796 | A1 * | 7/2018 | Wu ....................... G06F 40/289 |
| 2018/0231954 | A1 | 8/2018 | Booker |
| 2022/0179888 | A1 * | 6/2022 | Wang ................... G06F 16/338 |

* cited by examiner

METHOD FOR CONTROLLING A PROCESS USING A PROGRAM PRODUCT

REFERENCE TO PENDING PRIOR PATENT APPLICATIONS

This patent application is a 371 national stage entry of pending prior International (PCT) Patent Application No. PCT/162020/062333, filed 22 Dec. 2020 by Cafer Tosun for METHOD FOR CONTROLLING A PROCESS USING A PROGRAM PRODUCT, which patent application, in turn, claims benefit of German Patent Application No. 10 2020 128 027.0, filed 23 Oct. 2020.

The two (2) above-identified patent applications are hereby incorporated by reference.

FIELD OF THE INVENTION

The present invention relates to a method for controlling a process with a program product.

BACKGROUND OF THE INVENTION

It has long been known to control processes via software. There are a wide variety of approaches for this, with which an interaction between the users and the operating resources can take place. In general, software for process control can implement a workflow that runs within the framework of the control and in which the user can intervene if necessary.

For example, a sequence diagram can be programmed in the PLC control, which also includes sensors and actuators and takes them into account as inputs and outputs, so that an operating state of the process can be determined for the control. A higher-level visualization can make the entries easier and more intuitive, so that even a user who is not trained can quickly find his way around.

In principle, a number of interaction options are available to the user. The user can choose from the available options, but they are not always fully useful at all times. A new user who is to be trained generally needs an experienced employee who knows the process in order to give him the right instructions to control the process correctly.

SUMMARY OF THE INVENTION

Against this background, the present invention is based on the task of describing a method for controlling a process which enables process control in a simple and intuitive manner even without in-depth knowledge of the process.

This is achieved by a method for controlling a process according to the features of independent claim 1. Useful embodiments of such a method can be taken from the following dependent claims.

According to the invention, a process is controlled by a program product that uses a process plan stored as a workflow. However, the program product converts the workflow into a chat, which is conducted between the users who act as communication participants in this context. The program product distinguishes between virtual communication participants, such as a chatbot of the program product itself, as well as any connected machines, and real communication participants, i.e. users. As in any chat, all communication participants can write messages in a chat room that is assigned to the process. These messages are visible to all communication participants who have access to the respective chat room. This is particularly advantageous, as it allows every communication participant to follow the development of decisions on the same information basis and to intervene in the communication if necessary.

With his messages, the (at least one) virtual communication participant of the program product controls the course of the conversation in the chat to a significant extent. The real communication participants have the opportunity to exchange additional messages with each other, which do not necessarily have to do with the process control, but the required data is queried by the (at least) one virtual communication participant and answers to the questions asked are recorded by the program product. In principle, any process, be it technical or organizational, can be controlled in this way.

In order to ensure that the process is as intuitive as possible, the real communication participants can be allowed to enter their answers to questions asked by the virtual communication participants, or else instructions given on their own initiative, in free speech. This is especially possible if a parser is assigned to the program product, which parses the messages entered into the chat and extracts control commands from keywords in the messages. This can involve selection decisions that the virtual communication subscriber of the program product has specified, whereupon a simple yes or no can be sufficient in individual cases. In such cases, the parser or an evaluation within the program product must take the previous messages into account in the evaluation.

On the other hand, a parser can be dispensed with if only buttons are used, which are worked into the messages of the virtual communication participant, and which can be displayed and operated in an interface of the program product. However, such buttons can also be used in addition to a parser and allow a simple and quick reaction to the queries made, in individual cases with a simple click.

Furthermore, the chat can be divided into several chat sections. These enable several processes or process sections to be processed in parallel and can also be operated and continued independently of one another. If necessary, you can scroll separately in the individual chat sections to read a decision that was made a long time ago or to track the origin of the decision. By dividing into chat sections, the user can keep an eye on several processes or sections of processes at the same time on a desktop or mobile device.

In addition to calling or retrieving the modeled processes from the database of the program product, a third-party software can also be called via an interface. This results in a uniformed and harmonized look and feel of the process control for the real communication participants, while multiple different systems involved can be operated.

Different relationships can exist between the real communication participants, which affect the program product, as well as the process and its sequence. For example, a communication participant can be the superior of another or have the authority to issue certain approvals or instructions. These properties can be mapped within the program product using characteristics that are assigned to the communication participants and stored in the program product. The program product also aligns its communication with this. For example, a button for releasing a process can be displayed in the chat history of a department manager, which is not displayed to other communication participants. Instructions from other communication participants can also be ignored if they contradict those of a superior or if they do not have permission to issue such instructions.

A timestamp can also be added to messages within the chat history. On the one hand, this allows the chronological sequences of the process to be traced and a total runtime to be recorded, and statistics to be kept on this or on the response times, on the other hand, this allows the program product to remind the addressee of an instruction in the case of instructions that are requested in a time-critical manner.

With regard to the system architecture of the program product, it can preferably be a mobile client application, which, however, can also have a server component. In this way, it is possible for the program product to run on one or more mobile devices. The processes modeled in advance can be stored in a database accessible via the Internet, for example, and can be retrieved via the program product. In particular, the server component, insofar as it is implemented, can also run on a resource that can be accessed via the Internet.

Real communication participants can also access the program product or its server component via a public communication network, so that participation in the system is not restricted to a local network. This allows external users to be included in the process.

The communication taking place within the chat can initially take place between real communication participants, such as a user, and virtual communication participants, such as a chatbot of the program product or connected production machines. In this case, virtual communication participants request instructions or information that are required in the modeled process. Furthermore, messages can also be sent between several real communication participants, for example in the context of a conventional chat. This allows the exchange of information on a convenient and accessible level. Finally, virtual communication participants can also send messages to one another, which they can interpret as mutual instructions or the provision of information. For example, the server component as a process controller can issue a control command to a machine in response to a release from a real communication participant in order to continue the process according to its planned sequence.

In an advantageous development of such a program product and an associated method, provision can be made for each communication participant to be assigned its own chatbot. Such a chatbot is basically able to send messages to the chat. However, it also reacts to messages from other chatbots or communication participants in general by using a parser to search their messages for keywords, instructions or inquiries and evaluate them. In addition, the chatbot is designed to be self-learning, so that it learns a behavior from the parameters in a situation and the reactions of other communication participants, as well as from the system response to its own communication. Based on this learned behavior, the chatbot will now automatically send its messages to the chat and thus carry out the task assigned to it. This can be in the assignment to an actuator, a sensor, or another machine part, but also in the control of an entire machine or the control of program parts such as functions.

A chatbot can preferably also be assigned to each real, i.e. human, communication participant, which learns during the personal communication of the real communication participant, without sending messages into the chat. However, such a chatbot will create its own answer in every situation and compare it with the actual answer of the real communication participant in order to learn his behavior in this way. In the absence of the real communication participant, after a corresponding learning phase, the chatbot can take over the communication and then, upon express instruction, for example in the context of the function of an absence assistant, send messages to the real communication participant in his name and according to the patterns learned from him.

A parser assigned to this chatbot will parse not only the messages of other communication participants but also the messages of its own, real communication participant in order to learn to imitate his writing style and behavior. In this way, a real communication participant can be preserved even in case of vacation, absence or illness, since the chatbot can take over his communication. Even after the real communication participant leaves the company, the chatbot can, at least transitionally, continue his communication until a new employee is found. In borderline cases, the chatbot can completely replace the employee after his departure due to the acquired knowledge.

In this context, a self-learning chatbot can have an artificial intelligence to which a knowledge database is assigned, which on the one hand contains basic knowledge about the processes, structures and parameters of the processes to be controlled, but which on the other hand is supplemented by learning knowledge derived from the communication data of the communication participants. The chatbot can acquire its knowledge from the communication in the chats in which it participates. Preferably, each chatbot fills its own knowledge base, so that each chatbot has its own individual knowledge at its disposal. While the basic knowledge is made available at the beginning, the chatbot supplements this knowledge permanently by learning from the communication processes.

In addition to basic knowledge, it is also possible to compare knowledge bases in a superordinate instance and to check which knowledge is required widely and should therefore be added to the basic knowledge. As soon as a fact is contained in a certain proportion of the knowledge bases, it can be distributed as a data record to all knowledge bases.

Furthermore, the structure of the data in the knowledge base can also be made dependent on characteristics of the chatbots. Such characteristics can primarily be the affiliations to certain groups. For example, all chatbots that are assigned to actuators or sensors or have to communicate directly with them can have control commands or queries in their basic knowledge, which chatbots on higher levels do not need because they can query these data from other chatbots. Content-related delimitations can also be made by individual departments forming a group, so that a locally required fact only has to be distributed within the group because it only applies there.

During the learning process, the chatbot acquires a large amount of data that it must process. It may be that information contradicts itself. On the one hand, a supervisor relationship can ensure that the more experienced employee is given more weight in the evaluation of his communication than is the case with an inexperienced employee. On the other hand, an own assessment of the artificial intelligence is important, which verifies the learned content. After all, erroneous instructions can be made due to mistakes or even arithmetic or spelling errors, or a joking or even sarcastic instruction could be sent into the chat with real communication participants. In addition to a weighting based on characteristics of the communicator, the artificial intelligence preferably also carries out a weighting based on probabilities, which can be based on learning data from the knowledge base and a comparison of the new learning data with this existing learning data, particularly in the case of contradictions.

Finally, a monitoring instance can be assigned to the program product, which makes it possible to monitor and evaluate the chatbots and their decisions, as well as their messages in the chats, and to evaluate or compare the respective knowledge bases. This creates a control to accompany the development of the chatbots over time and to ensure their permanent function.

The invention described above is explained in more detail below using an exemplary embodiment.

DETAILED DESCRIPTION OF THE PREFERRED EMBODIMENTS

Figure 1:
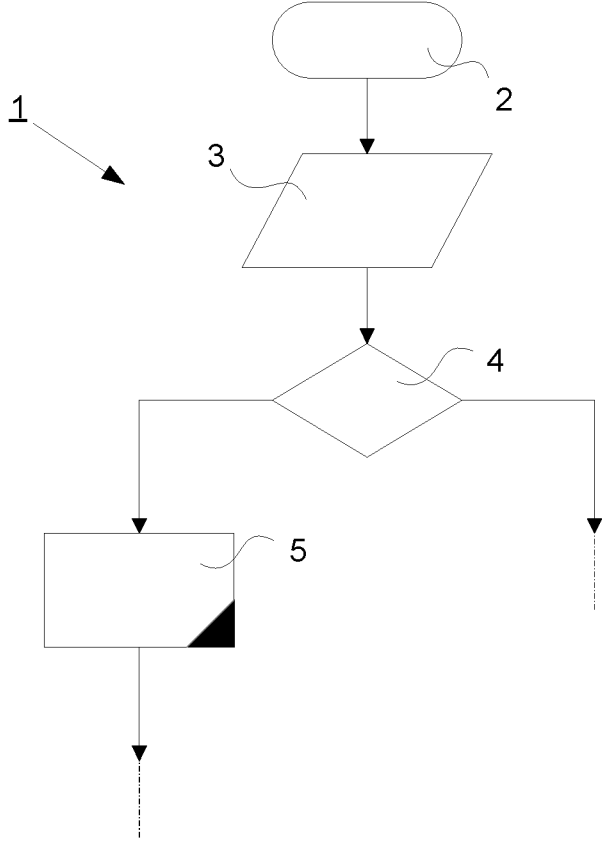
FIG. 1 shows a process modeled in advance in a schematic representation as a flowchart.

FIG. 1 shows a section of a previously modeled process 1, which consists of various process steps 2, 3, 4, 5. Such a process 1 is stored as a model in a database and this can be used from there with a method according to the invention using a program product 7 to control the process 1. In a simple example, the process 1 initially has a start 2, which is reached as a result of the process 1 being called by the program product 7, which is shown in more detail in FIG. 2.

The start 2 of the process 1 directly triggers a welcome message 3 without further conditions, which the chatbot of a virtual communication participant of the program product 7 posts in a chat section 9. This is followed by a first selection decision 4, to which a real communication participant involved in the process 1 responds with an instruction or a message 8. If the real communication participant answers yes, a function 5 is triggered. Process 1 can be continued, but in the present case is limited to the functions mentioned. The selection decisions of the real communication participant are accompanied by a chatbot, which is assigned to the real communication participant. The chatbot monitors and learns the behavior of the real communication participant by making its own decisions, but does not execute them, but compares them with the actually communicated messages 8 of the real communication participant in order to learn its behavior. After a sufficient learning phase, the real communication participant is able to access the chatbot for his communication, which acts in the chat as it has learned from the real communication participant. He can then take the place of the communication participant as a vacation replacement, between shifts or, if necessary, after the communication participant has left the company as an employee and saves the knowledge of the real communication participant, which in this way is retained by the company.

Figure 2:
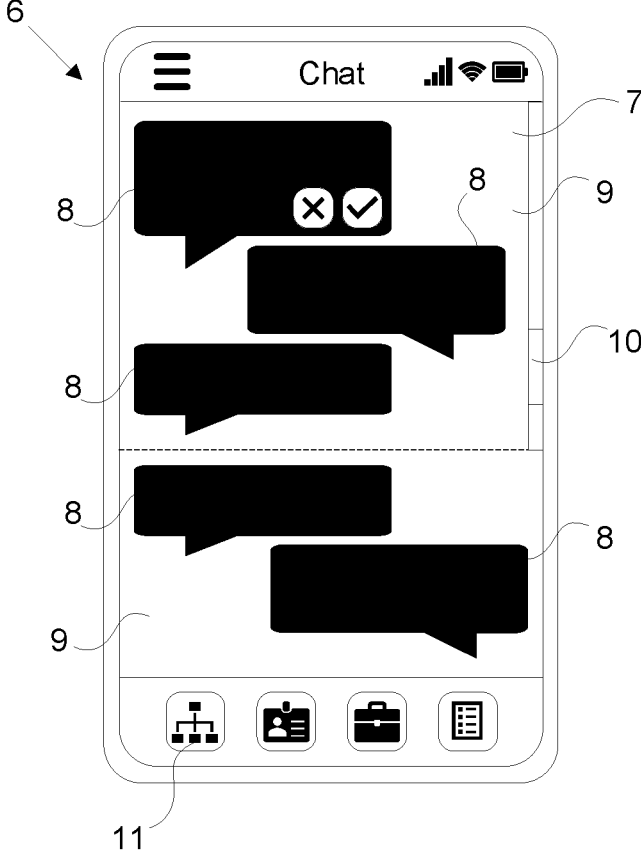
FIGS. 2 and 3 show a mobile device on which a program product is running, in a schematic, frontal top view.
Figure 3:
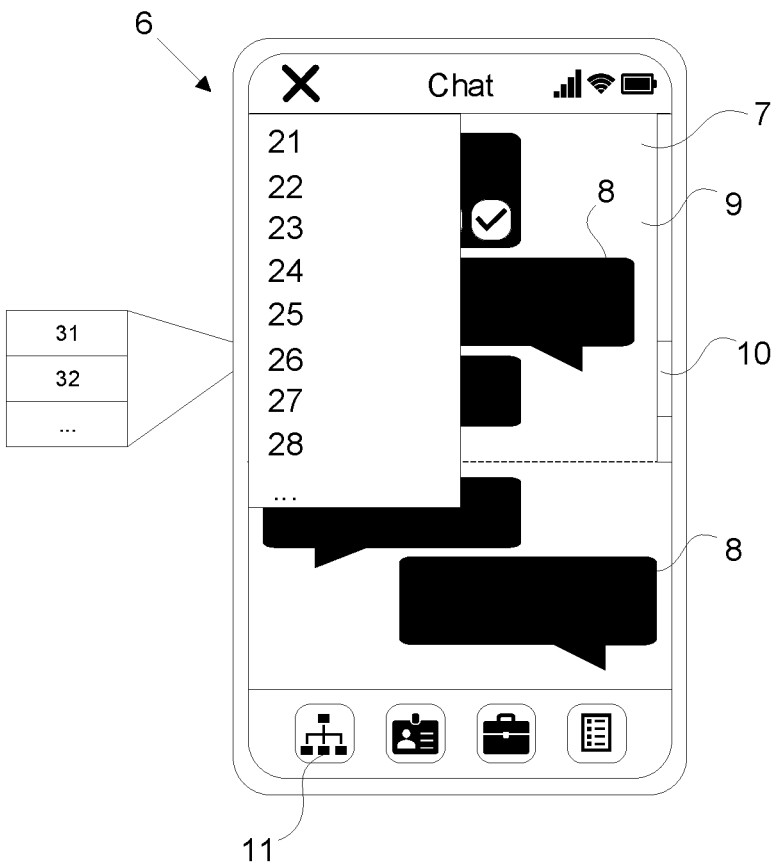

FIG. 2 shows the implementation of the process 1 model shown in FIG. 1, as it appears on a mobile device 6 on which the program product 7 runs. The program product 7 is divided into a server component and a client component, with the server component being stored and running on a server which can be accessed from the Internet. A database is also assigned to the server component, in which modeled processes 1 are kept that can be called up by the client component of the program product.

On the mobile device 6, the client component of the program product 7 is divided into a part with a number of chat sections 9, in which a number of sections of a process 1 or a number of processes 1 are running and can be tracked at the same time. Individual chat sections 9 can also be scrolled and focused independently of one another using a scroll bar 10. The client component of the program product 7 is constructed as a chat window in which messages 8 are displayed as speech bubbles. The messages whose speech bubbles are directed to the right were contributed by the real communication participant who owns the mobile device 6 or his personal chatbot, whereas the speech bubbles pointing to the left were contributed by all other communication participants and their chatbots. Among the other communication participants is at least one virtual communication participant, exclusively in the form of a chatbot, which posts messages 8 according to the specifications of the model of the process 1 according to FIG. 1. After the start 2 of the process 1, the chatbot had therefore set a welcome message 3 and now shows a query for a selection decision 4 in its message 8 shown at the top, which it presents to the communication participants for an answer. The real communication participant, who owns the mobile device 6, puts a further message 8 in the round of the upper chat section 9 and receives a query after a while a reply from another communication participant. With this information, the present communication participant can now answer the chatbot's query and make a decision, which he either writes in plain text in a further message 8 in the chat, or selects by clicking on a selection in the chatbot's message.

This is followed by the personal chatbot and learning data derived from it is added to its knowledge base, which is individually assigned to each chatbot.

If required, it is also possible to view and participate in additional processes in further chat sections 9, or to use a process interface 11 to display master data, make settings or start new processes, which then run integrated in the common interface of the program product 7.

For example, via a so-called burger menu, a selection list can be displayed on the surface of the program product 7, in which all ongoing chat groups 21-28 are listed. These chat groups 21-28 can each correspond to a work step in a process, such as planning, order processing, etc. Chatbots 31, 32 are assigned to each of these work steps and interact with one another in the respective work step within the chat. It is easily possible for a chatbot 31, 32 to be active in several chat groups 21-28 if the associated communication participant, be it a real person or a process component represented by the chatbot 31, 32, such as an actuator or sensor, is a machine or is a function.

A method for controlling a process is thus described above, which enables process control even without in-depth knowledge of the process in a simple and intuitive manner.

REFERENCE LIST

1 Process
2 Start
3 Welcome message
4 Selection Decision
5 Function
6 Mobile Device
7 Programm product
8 Communication
9 Chat section
10 Scroll bar
11 Process interface
21-28 Chat groups
31-32 Chatbots

The invention claimed is:

1. A method comprising:
generating a first chat session responsive to a control signal that invokes a workflow in a workflow database the control signal generated responsive to a fault in an enterprise process, the first chat session having at least a first real participant and at least a first virtual participant controlled by the workflow, the first virtual participant uniquely associated with the enterprise process;

uniquely assigning a first chat bot, by a processor over a distributed network, to the first real participant, the first chat bot using semantic context and any prior predictions to predict a chat interaction by the first real participant and comparing the predicted interaction with an actual interaction and refining future predictions based on an accuracy of the predicted interaction;

uniquely assigning a first parser to the first chat bot, the first parser, parsing messages in the first chat session including messages submitted by the first real participant;

modifying a first knowledge base, uniquely assigned to the first chat bot, over the distributed network within a storage resource coupled to the distributed network based on the accuracy of the prediction;

modifying the first knowledge base over the distributed network to include a linguistic style of the first real participant based on the parsing of the messages submitted by the first chat participant;

repeating the prediction, refining, and modifying for a plurality of interactions in the first chat session; and timestamping each interaction of the first chat session.

2. The method of claim 1 further comprising:

generating a second chat session responsive to a subsequent control signal that invokes the workflow in the workflow database;

substituting the first chat bot in place of the first real participant to interact with the first virtual participant during the second chat session without input from the first real participant.

3. The method of claim 1 further comprising:

evaluating response times for participants in the workflow by analyzing a plurality of time stamps from the first chat session to determine a throughput value for the workflow.

4. The method of claim 1 further comprising:

calculating from a plurality of time stamps an average response time of the first real participant.

5. The method of claim 1 wherein a second real chat participant participates in the first chat session further comprising:

uniquely assigning a second chat bot to the second real chat participant, the second chat bot using semantic context and any prior predictions to predict a chat interaction by the second real chat participant and comparing the predicted interaction with an actual interaction and refining future predictions based on an accuracy of the predicted interaction.

6. The method of claim 5 wherein predicting the chat interaction comprises:

parsing messages within the first chat session to generate ordered message data; and comparing, in the second chat bot, the ordered message data with prior learned responses to infer a probable response based on similarities between the ordered message data and ordered message data from at least one prior chat session.

7. The method of claim 1 further comprising:

assigning a first parser to the first virtual participant; and parsing the messages in the first chat session to directly generate control commands within the workflow.

8. The method of claim 7 further comprising:

issuing the control command from the first virtual participant through a process interface that provides access to at least one process external to the first chat session.

9. The method of claim 5 wherein each of the first and the second chat bots are assigned a unique knowledge base at creation, the method further comprising:

independently building each unique knowledge base from the predictions and the prediction accuracy of the assigned chat bot.

10. The method of claim 9 further comprising:

collectively monitoring the first and second chat bots to compare knowledge bases and relative prediction accuracy.

11. The method of claim 1 further comprising:

assigning a first parser to the first virtual participant; and parsing the messages in the chat session to trigger a further action or command within the workflow.

* * * * *